(12) United States Patent
Kousaka

(10) Patent No.: US 9,286,462 B2
(45) Date of Patent: Mar. 15, 2016

(54) APPARATUS AND METHOD FOR AUTOMATIC LOGIN

(75) Inventor: Satoshi Kousaka, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 115 days.

(21) Appl. No.: 13/596,400

(22) Filed: Aug. 28, 2012

(65) Prior Publication Data

US 2014/0041009 A1 Feb. 6, 2014

(30) Foreign Application Priority Data

Sep. 7, 2011 (JP) .................................. 2011-194485

(51) Int. Cl.
*G06F 21/35* (2013.01)
*G06F 21/34* (2013.01)
*H04L 29/06* (2006.01)

(52) U.S. Cl.
CPC ................ *G06F 21/35* (2013.01); *G06F 21/34* (2013.01); *H04L 63/0492* (2013.01); *H04L 63/0807* (2013.01); *H04L 63/0853* (2013.01)

(58) Field of Classification Search
CPC .................................. H04L 63/08; G06F 21/34
See application file for complete search history.

(56) References Cited

U.S. PATENT DOCUMENTS

| | | | | |
|---|---|---|---|---|
| 2003/0212894 | A1* | 11/2003 | Buck et al. | 713/184 |
| 2006/0015739 | A1* | 1/2006 | Suzuki | 713/182 |
| 2008/0092217 | A1* | 4/2008 | Nagami et al. | 726/5 |
| 2009/0235345 | A1 | 9/2009 | Oikawa et al. | |
| 2010/0114773 | A1* | 5/2010 | Skowronek | 705/44 |
| 2010/0169962 | A1* | 7/2010 | Lu | 726/9 |

FOREIGN PATENT DOCUMENTS

| | | | |
|---|---|---|---|
| EP | 1862948 | * | 5/2007 |
| JP | 2008-040909 A | | 2/2008 |
| JP | 2009-223452 A | | 10/2009 |

* cited by examiner

*Primary Examiner* — Jeffrey Pwu
*Assistant Examiner* — Wasika Nipa
(74) *Attorney, Agent, or Firm* — Hazuki International, LLC

(57) ABSTRACT

There is provided an information processing apparatus including a non-contact communication section that performs non-contact communication with a communication device which stores at least two pieces of software outputting information necessary for enjoying a predetermined service provided by a server, an obtaining section that obtains connection target information for connecting to the server and identification information indicating the software corresponding to the connection target information, and a control section that performs control of, via the non-contact communication section, issuing an instruction to the communication device to execute the software indicated by the identification information, obtaining an execution result of the software executed in accordance with the instruction, and transmitting the execution result to the server.

16 Claims, 13 Drawing Sheets

FIG.6

| SERVICE NECESSARY APPLICATION NAME | APPLICATION IDENTIFIER | JUMP SITE INFORMATION |
|---|---|---|
| OTP APPLICATION 1 | 123456 | http://www.xxx.com |
| OTP APPLICATION 2 | 234567 | http://www.yyy.co.jp |
| | | |

FIG.7

INITIAL SETTING SCREEN

| CONNECTION FLAG | INNER SITE | JUMP SITE INFORMATION | USER ID | SERVICE NECESSARY APPLICATION NAME |
|---|---|---|---|---|
| ☑ | ☐ | http://www.xxx.com | user A1 | OTP APPLICATION 1 |
| ☐ | ☐ | http://www.yyy.co.jp | user B1 | OTP APPLICATION 2 |
| ☐ | ☐ | | | |

☑ DO NOT DISPLAY FROM 2ND TIME OR LATER

[REGISTER]  [CANCEL]

FIG.13

INITIAL SETTING SCREEN
171

| CONNECTION FLAG | INNER SITE | JUMP SITE INFORMATION | USER ID | SERVICE NECESSARY APPLICATION NAME |
|---|---|---|---|---|
| ☑ | 1 | http://www.xxx.com | user A1 | OTP APPLICATION 1 |
| ☐ | 2 | http://zzz.com | user A1z | OTP APPLICATION 1z |
| ☐ | | | | |
| ☐ | | | | |

172 — ☑ DO NOT DISPLAY FROM 2ND TIME OR LATER

REGISTER 173    CANCEL 174

APPARATUS AND METHOD FOR AUTOMATIC LOGIN

CROSS-REFERENCE TO RELATED APPLICATION

The present application claims priority from Japanese Patent Application No. JP 2011-194485 filed in the Japanese Patent Office on Sep. 7, 2011, the entire content of which is incorporated herein by reference.

BACKGROUND

The present technology relates to information processing apparatuses, information processing methods and programs, in particular to an information processing apparatus, an information processing method and a program capable of easily logging to plural service sites.

Recently, the development of IT technology makes it possible to obtain various kinds of information using the Internet and the like. On the other hand, regardless to transaction between businesses (B2B) or between a business and a general consumer (B2C), in order to obtain high quality information from predetermined service sites, it is increasingly necessary to login first to a portal Web site or a single sign-on top site of a service site.

As an authentication method to login to a portal Web site or single sign-on site, there are known methods which use a user ID and a token password or the like. Also, in these days, more secure two elements authentication which uses one time password is employed (refer to, for example, JPA-2008-40909 and JP-A-2009-223452 (paragraph 0004)). JP-A-2008-40909 teaches a login authentication which uses one time password generated by a mobile phone.

SUMMARY

However, when the login authentication which uses one time password is widely used and when a user login to plural service sites using one time password, the following problem will occur. That is, a user has to memorize applications for login authentication corresponding to service sites to login, and activate appropriate application for login authentication every time of use, and has to input necessary information.

The present technology has been proposed under such circumstances in order to make it possible to easily login to plural service sites.

According to a first aspect of the present technology, there is provided an information processing apparatus, including a non-contact communication section that performs non-contact communication with a communication device which stores at least two pieces of software outputting information necessary for enjoying a predetermined service provided by a server, an obtaining section that obtains connection target information for connecting to the server and identification information indicating the software corresponding to the connection target information, and a control section that performs control of, via the non-contact communication section, issuing an instruction to the communication device to execute the software indicated by the identification information, obtaining an execution result of the software executed in accordance with the instruction, and transmitting the execution result to the server.

According to the first aspect of the present technology, there is provided an information processing method, including obtaining connection target information for connecting to a server which provides a predetermined service and identification information indicating the software corresponding to the connection target information, and performing control of, through non-contact communication with a communication device which stores at least two pieces of the software, issuing an instruction to the communication device to execute the software indicated by the identification information, obtaining an execution result of the software executed in accordance with the instruction from the communication device, and transmitting the execution result to the server.

According to the first aspect of the present technology, there is provided a storage medium storing a program causing a computer to function as a non-contact communication control section that performs control of non-contact communication with a communication device which stores at least two pieces of software outputting information necessary for enjoying a predetermined service provided by a server, an obtaining section that obtains connection target information for connecting to the server and identification information indicating the software corresponding to the connection target information, and a transmission control section that performs control of issuing an instruction to the communication device to execute the software indicated by the identification information via the non-contact communication, obtaining an execution result of the software executed in accordance with the instruction via the non-contact communication, and transmitting the execution result to the server.

In the first aspect of the present technology, a piece of connection target information for connecting to a server which provides a predetermined service and a piece of identification information indicating the software corresponding to the piece of connection target information are obtained, and controlling is performed to perform a non-contact communication with a communication device which stores at least two pieces of the software, to give an instruction to execute the software indicated by the identification information to the communication device, to thereby obtain an execution result of the software executed by the instruction from the communication device, and to transmit the same to the server.

According to a second aspect of the present technology, there is provided an information processing apparatus, including a non-contact communication section that performs non-contact communication with an information processing terminal that performs processing to access to a server which provides a predetermined service, a storage that stores at least two pieces of software for outputting information necessary for the information processing terminal to enjoy the service from the server, and an execution section that executes predetermined software out of the at least two pieces of software stored in the storage in accordance with an instruction from the information processing terminal. The non-contact communication section transmits an execution result obtained by the execution section to the information processing terminal in a manner of non-contact communication.

In the second aspect of the present technology, a non-contact communication is performed with an information processing terminal that performs processing to access to a server which provides a predetermined service, and a piece of predetermined software in the at least two pieces of software stored in the storage that stores at least two pieces of software for outputting a piece of information necessary for the information processing terminal to enjoy the service from the server is executed in accordance with an instruction from the information processing terminal. An execution result is transmitted to the information processing terminal in a manner of non-contact communication.

The non-contact communication means a communication made in a non-contact manner within a range of distance of several 10 cm or less between the communicating apparatuses, including a communication made by communicating apparatuses (housings thereof) in contact with each other.

The program may be provided by a transmission via a transmission medium or by being recorded on a recording medium The information processing apparatus may be independent apparatus or an inner block constituting an apparatus.

According to the first and second aspects of the present technology, it is possible to easily login to plural service sites.

BRIEF DESCRIPTION OF THE DRAWINGS

FIG. 6 illustrates an example of an application list;

FIG. 7 illustrates an example of an initial setting screen;

FIG. 13 illustrates an example of the initial setting screen in FIG. 12.

DETAILED DESCRIPTION OF THE EMBODIMENT(S)

[Example of Configuration of Automatic Login System]

Figure 1:
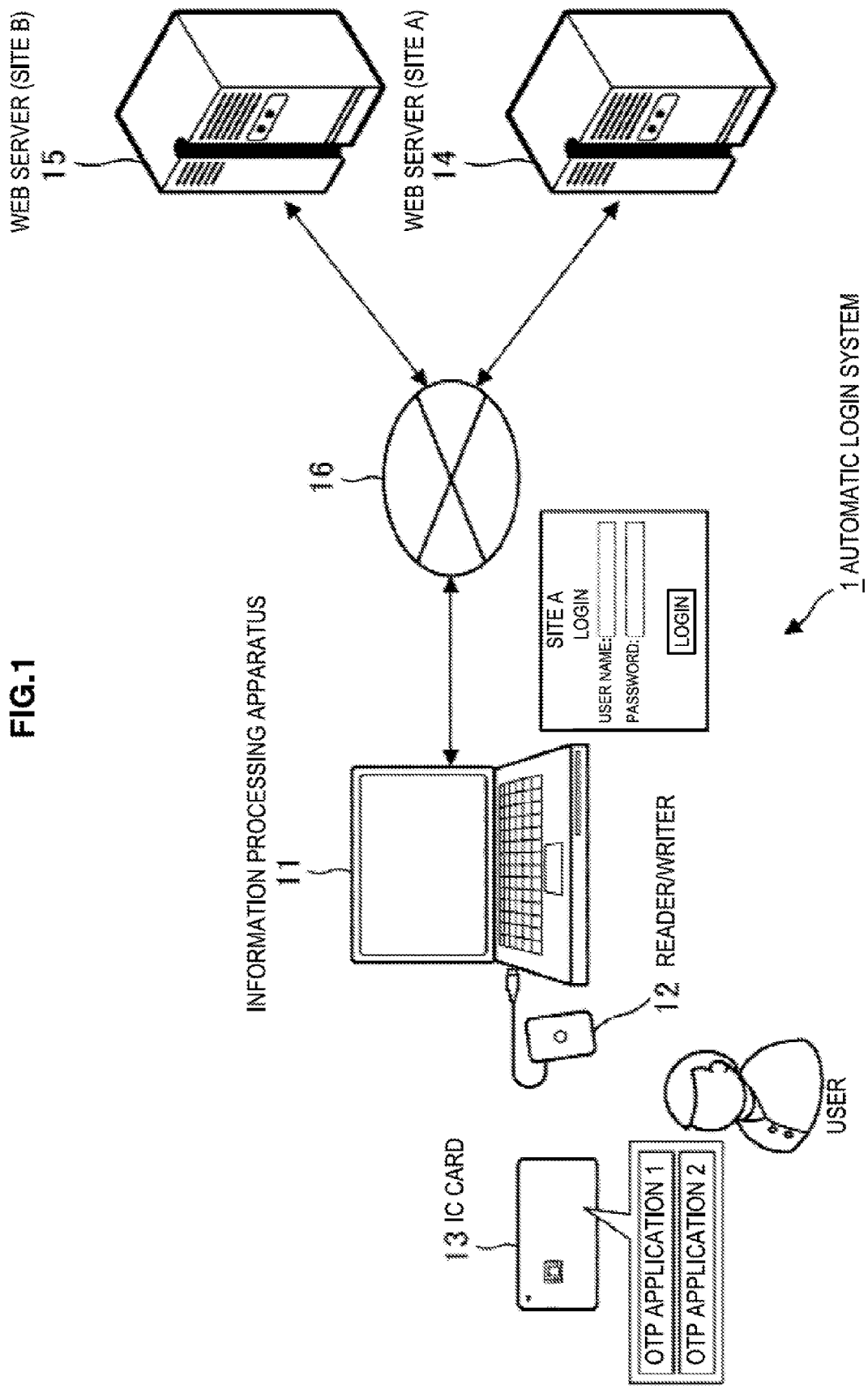
FIG. 1 illustrates an example of configuration of an embodiment of an automatic login system to which the present technology is applied.

FIG. 1 illustrates an example of configuration of one embodiment of an automatic login system to which the present technology is applied.

An automatic login system 1 shown in FIG. 1 is a system which allows a user to login with a simple procedure when the user intends to login to a service site which provides a predetermined service.

The user connects to a Web server 14 or a Web server 15 from an information processing apparatus 11 via a network 16 such as Internet to enjoy services of a site providing by a Web server 14 or a Web server 15. Hereinafter, a Web site constructed by the Web server 14 is defined as site A; and a Web site constructed by the Web server 15 is defined as site B.

The site A and the site B are Web sites which provide users predetermined useful information. The site A and the site B employ a login authentication which uses a user name and a one time password as shown in FIG. 1.

The information processing apparatus 11 is an apparatus which is used by a user to access to the site A or site B. For example, the information processing apparatus 11 is constituted of a personal computer. The information processing apparatus 11 is connected to a reader/writer 12.

The reader/writer 12 detects an IC card 13 held over the same by a user, and performs non-contact communication with the IC card 13 via electromagnetic induction using carrier wave of a predetermined frequency. The non-contact communication means here a communication in a non-contact manner, which is possible within a distance of several 10 cm between the communicating apparatuses, including a contact communication between the communicating apparatuses (housings). The non-contact communication will be hereinafter referred to as proximity communication.

In the configuration shown in FIG. 1, the reader/writer 12 is provided separately from the information processing apparatus 11. However, the reader/writer 12 may be incorporated into the information processing apparatus 11 as a part thereof.

The IC card 13 has a non-contact communication function to perform non-contact communication with the reader/writer 12. The IC card 13 stores an OTP application 1 and an OTP application 2, which are application programs (software) for generating a one time password necessary for logging to the site A and site B.

In this embodiment, an example will be described, in which the IC card 13 stores two application programs (hereinafter, referred to as OTP application) for generating a one time password corresponding to the site A or site B. However, the IC card 13 may store three or more OTP applications. The OTP application is a service necessary application which outputs a piece of authentication information (one time password) necessary for enjoying a predetermined service provided from the site A or site B.

Receiving an instruction from the information processing apparatus 11, the IC card 13 starts and executes either one of specified OTP application from the OTP application 1 and the OTP application 2, outputs the one time password as an execution result, and transmits the same to the reader/writer 12 in the manner of non-contact communication.

The Web server 14 is a server apparatus that constructs the site A; and the Web server 15 is a server apparatus that constructs the site B.

[Configuration of Information Processing Apparatus]

Figure 2:
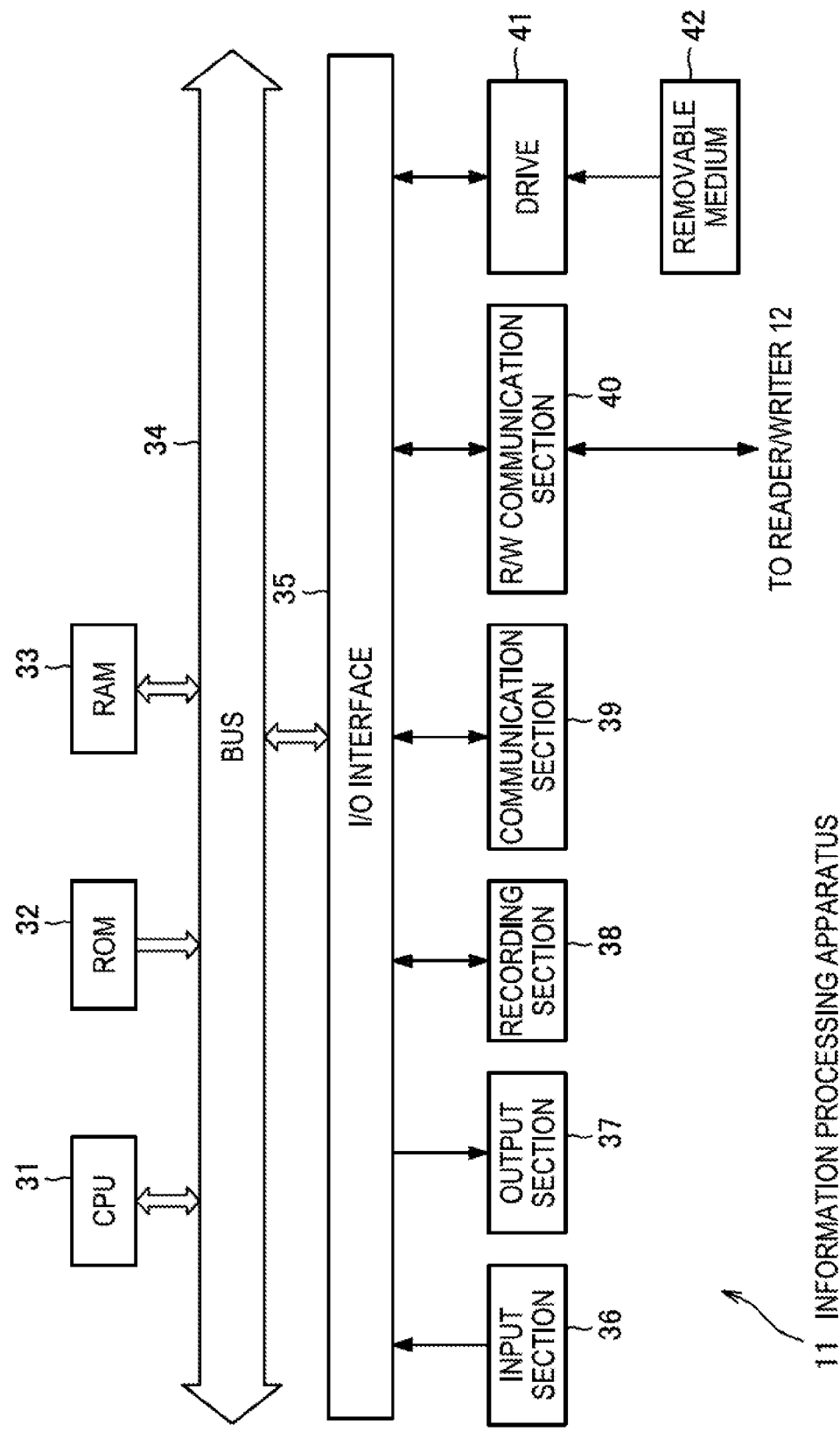
FIG. 2 is a block diagram illustrating an example of configuration of an information processing apparatus.

FIG. 2 is a block diagram illustrating an example of configuration of the information processing apparatus 11.

The CPU 31 executes various kinds of processing according to a program stored in the ROM 32 or a program recorded in the recording section 38. The RAM 33 appropriately stores programs and data which are executed by the CPU 31. These CPU 31, ROM 32 and RAM 33 are connected to each other via a bus 34.

The CPU 31 is also connected to an I/O interface 35 via the bus 34. The I/O interface 35 is connected to an input section 36 including a keyboard, a mouse and the like and an output section 37 including a display, a speaker and the like. The CPU 31 executes various kinds of processing corresponding to the instruction input from the input section 36.

The recording section 38 connected to the I/O interface 35 records programs which are executed by the CPU 31 and various data. The communication section 39 communicates with external apparatuses via a network such as Internet. Also, programs may be obtained through the communication section 39 and recorded in the recording section 38.

An R/W communication section 40 outputs commands and data, which are supplied from the CPU 31 via the I/O interface 35, to the reader/writer 12, and supplies the commands and data, which are input from the reader/writer 12, to the CPU 31. The programs executed by the CPU 31 include a device driver for controlling the reader/writer 12.

When a removable medium 42 such as magnetic disc, optical disk, magnet-optical disk, or semiconductor memory is mounted, a drive 41 connected to the I/O interface 35 drives the removable medium 42 to obtain programs and data recorded therein. The obtained programs and data are transferred to the recording section 38 and recorded therein, if necessary.

The information processing apparatus 11 is configured as described above.

[Configuration of Reader/Writer]

Figure 3:
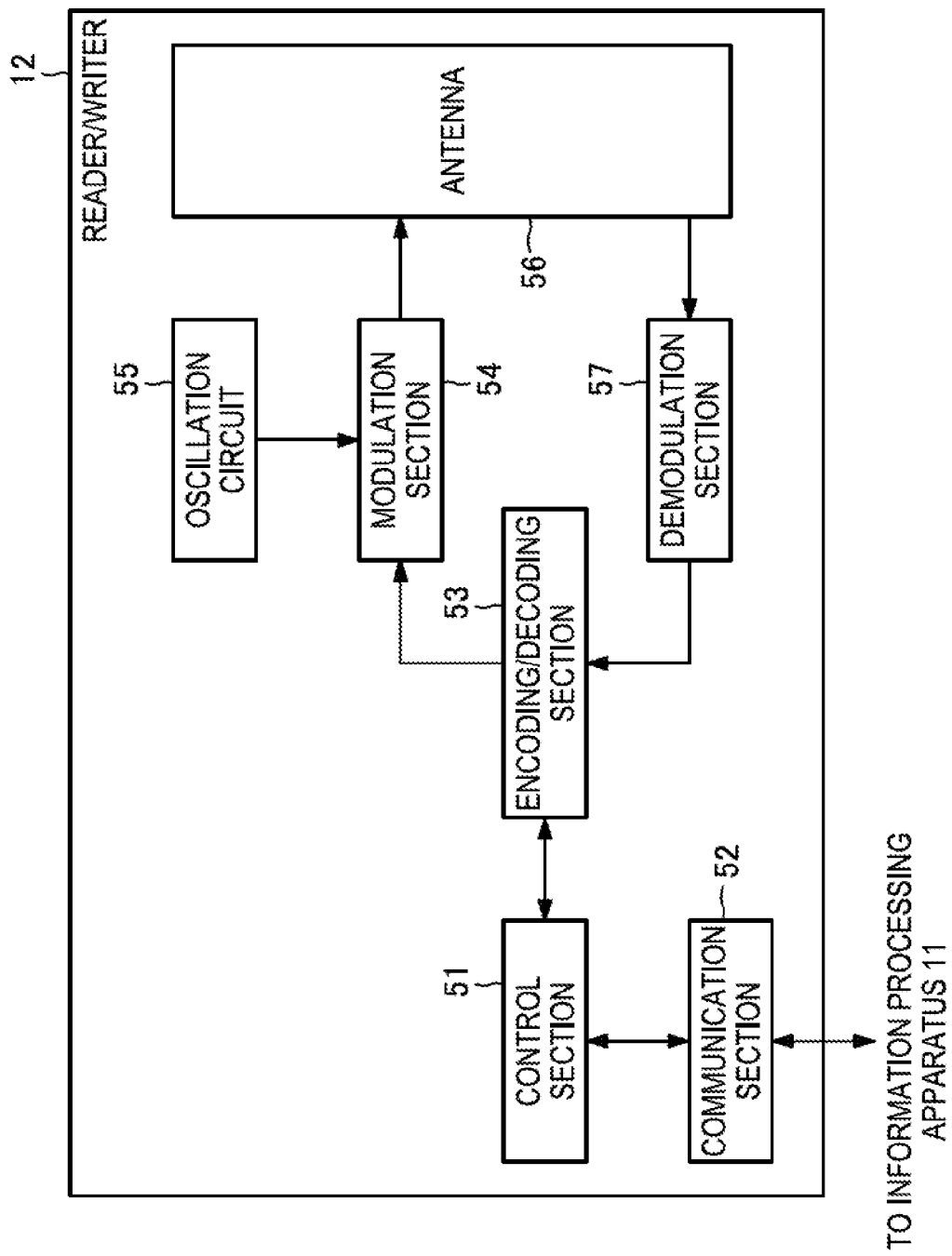
FIG. 3 is a block diagram illustrating an example of configuration of a reader/writer.

FIG. 3 is a block diagram illustrating an example of configuration of the reader/writer 12.

The reader/writer 12 is configured including a control section 51, a communication section 52, an encoding/decoding section 53, a modulation section 54, an oscillation circuit 55, an antenna 56, and a demodulation section 57.

The control section 51 controls the operation of the components of the reader/writer 12. Also, the control section obtains data which are supplied from the information processing apparatus 11 via the communication section 52, and supplies the same to the encoding/decoding section 53.

Figure 4:
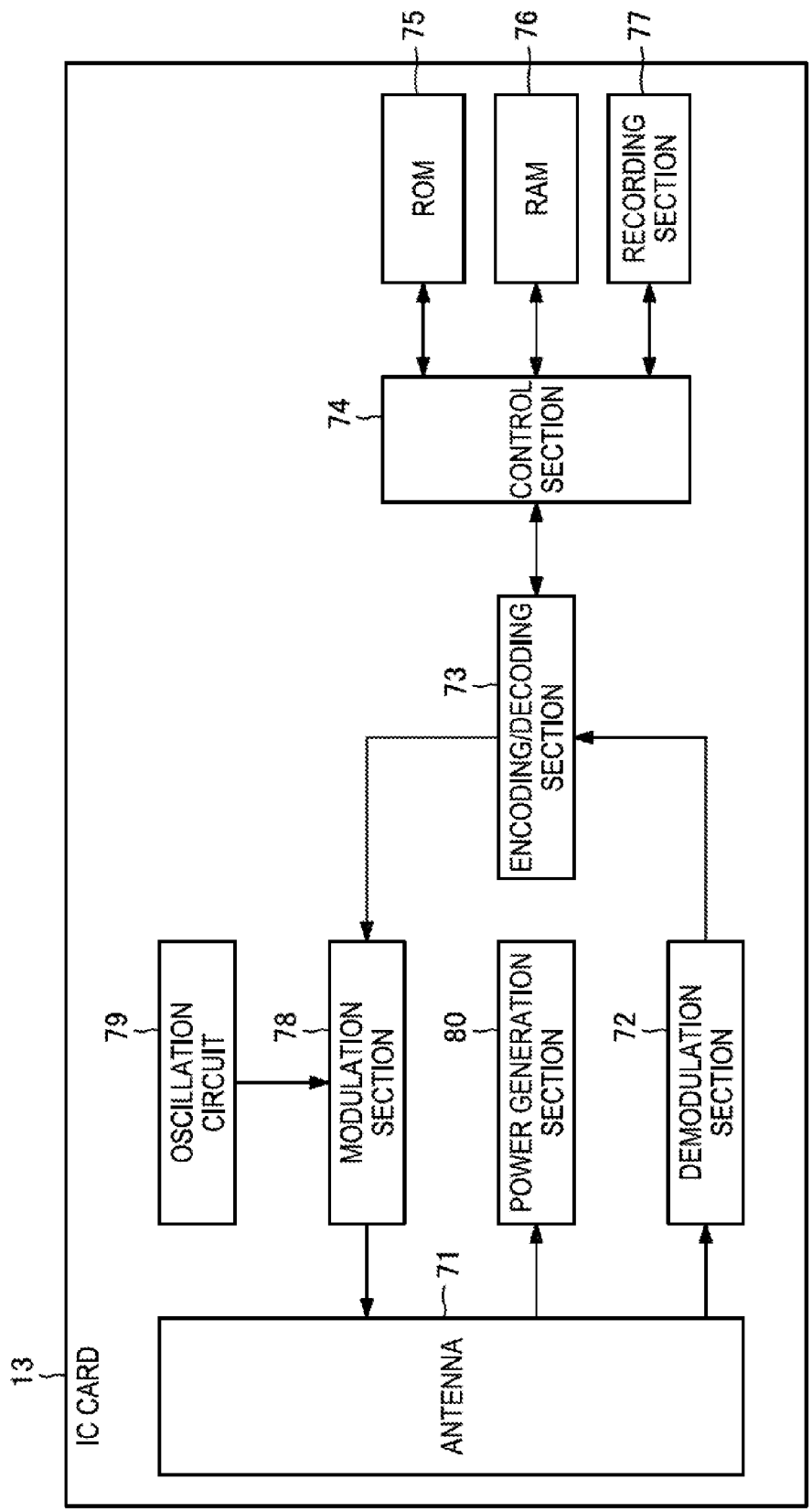
FIG. 4 is a block diagram illustrating a configuration of an example of an IC card.

The encoding/decoding section 53 encodes data supplied from the control section 51 with an encoding method corresponding to an encoding/decoding section 73 in FIG. 4; and the encoded data is supplied to the modulation section 54.

The modulation section 54 generates a carrier wave based on a clock signal of a predetermined frequency supplied from the oscillation circuit 55. The modulation section 54 modulates the data supplied from the encoding/decoding section based on the generated carrier wave, and supplies the modulated data obtained by the modulation to an antenna 56 with the modulation method corresponding to the demodulation section 72 shown in FIG. 4.

The antenna 56 transmits the modulation waves supplied from the modulation section 54 in a form of radio wave to the IC card 13 in a manner of proximity communication.

Also, the antenna 56 receives a modulation wave transmitted from the IC card 13 in a form of radio wave in a manner of proximity communication, and supplies the same to the demodulation section 57.

The demodulation section 57 demodulates the modulation wave supplied from the antenna 56 with a demodulation method corresponding to the modulation method of the modulation section 78 shown in FIG. 4; and supplies the data obtained by the demodulation to the encoding/decoding section 53.

The encoding/decoding section 53 decodes the data supplied from the demodulation section 57 with a decoding method corresponding to a decoding method of the encoding/decoding section 73 in FIG. 4; and supplies the data obtained by the decoding to the control section 51.

The control section 51 supplies the data supplied from the encoding/decoding section 53 to the information processing apparatus 11 via the communication section 52.

The communication section 52 supplies the data supplied from the information processing apparatus 11 to the control section 51. The control section 51 performs a predetermined processing on the data supplied from the information processing apparatus 11.

The reader/writer 12 is configured as described above.

[Configuration of the IC Card]

FIG. 4 is a block diagram illustrating a configuration of the IC card 13.

As shown in FIG. 4, the IC card 13 is configured including an antenna 71, a demodulation section 72, an encoding/decoding section 73, a control section 74, a ROM 75, a RAM 76, a recording section 77, a modulation section 78 and an oscillation circuit 79.

The antenna 71 receives the modulation wave transmitted from the reader/writer 12 as radio wave; and supplies the same to the demodulation section 72.

The demodulation section 72 demodulates the modulation wave supplied from the antenna 71 with a demodulation method corresponding to the modulation section 54 in FIG. 3; and supplies the data obtained by the demodulation to the encoding/decoding section 73.

The encoding/decoding section 73 decodes the data supplied from the demodulation section 72 with a decoding method corresponding to the encoding/decoding section 53 is FIG. 3; and supplies the data obtained by the decoding to the control section 74.

The control section 74 controls the operation of the components of the IC card 13.

The control section 74 also temporarily stores the data RAM 76; and reads a program recorded in the ROM 75 to execute the same. With this, the control section 74 performs a predetermined processing on the data supplied from the encoding/decoding section 73; and records the obtained data in the recording section 77.

The control section 74 obtains the data recorded by the recording section 77 to supply the same to the encoding/decoding section 73.

The encoding/decoding section 73 encodes the data supplied from the control section 74 with an encoding method corresponding to the encoding/decoding section 53 in FIG. 3; and supplies the data obtained by the encoding to the modulation section 78.

The modulation section 78 generates a carrier wave based on a clock signal of a predetermined frequency which is supplied from an oscillation circuit 79. The modulation section 78 modulates the data supplied from the encoding/decoding section 73 based on the generated carrier wave with a modulation method corresponding to the demodulation section 57 in FIG. 3; and supplies the data obtained by the modulation to the antenna 71.

The antenna 71 transmits the modulation wave supplied from the modulation section 78 to the reader/writer 12 in a form of radio wave with a proximity communication.

The power generation section 80 generates a DC power based on the AC electromotive force generated by the antenna 71 and supplies the power to the components of the IC card 13.

The IC card 13 is configured as described above.

The configuration for performing the proximity communication and the communication method achieved thereby are not limited to the above example, but another configuration and communication method may be employed.

[Block Diagram of Functional Configuration of Automatic Login System]

Figure 5:
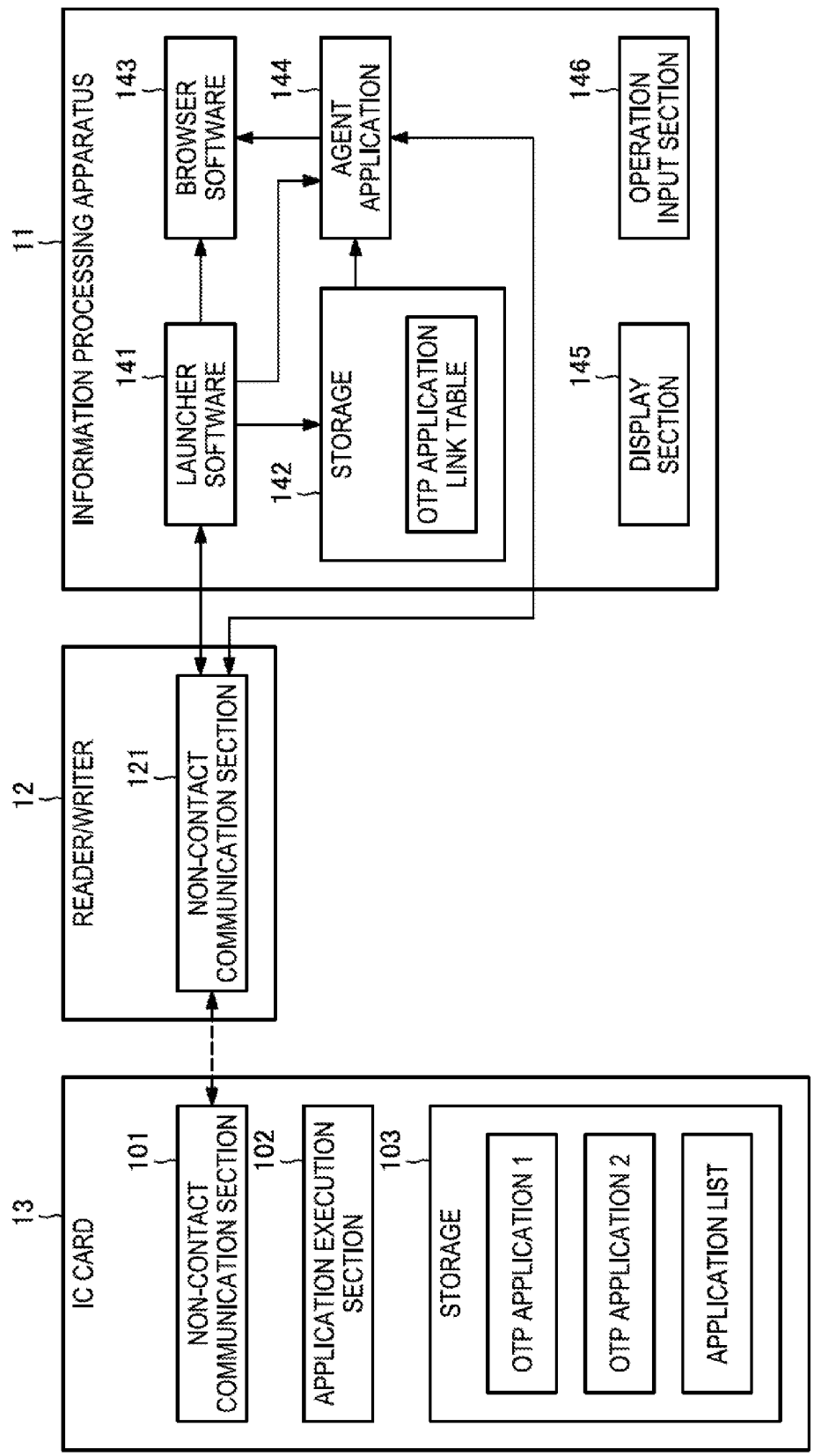
FIG. 5 is a functional block diagram of the information processing apparatus, the reader/writer and the IC card.

FIG. 5 is a block diagram illustrating the functions which are achieved by each of the information processing apparatus 11, the reader/writer 12 and the IC card 13 when a user accesses to the site A or the site B in the automatic login system 1 shown in FIG. 1.

The IC card 13 is configured including a non-contact communication section 101, an application execution section 102, and a storage 103.

The non-contact communication section 101 performs a non-contact communication with the reader/writer 12.

The application execution section 102 executes an OTP application stored in the storage 103 based on start and execution commands of the OTP application which is transmitted from the information processing apparatus 11 via the reader/writer 12. The execution result is transmitted to the information processing apparatus 11 via the reader/writer 12.

The storage 103 stores an execution program of two or more OTP applications and an application list thereof.

FIG. 6 illustrates an example of an application list stored in the storage 103.

The application list stores, for each service necessary application stored in the storage 103, a service necessary application name, an application identifier and a piece of jump site information. The service necessary application name is an appellation of the service necessary application. The application identifier is a piece of identification information for uniquely identifying the service necessary application. The jump site information is a piece of information necessary for indicting a Web server (Web site) to be connected to, which demands an execution result of the service necessary application.

The application list shown in FIG. 6 stores, as the service necessary application of the site A, a service necessary application name: "OTP application 1", an application identifier: "123456" and a piece of jump site information: "http://www.xxx.com". Also, the application list stores, as the service necessary application of the site B, a service necessary application name: "OTP application 2", an application identifier: "234567" and a piece of jump site information: "http://www.yyy.co.jp".

The application execution section 102 receives the application identifier which indicates the OTP application 1 or the OTP application 2, and a start and execution command from the information processing apparatus 11. The application execution section 102 executes the OTP application 1 or the OTP application 2 based on the application identifier to generate a one time password, and outputs the same as an execution result.

Returning to FIG. 5, the reader/writer 12 has a non-contact communication section 121 for performing a non-contact communication with the IC card 13 under the control by the information processing apparatus 11.

The information processing apparatus 11 is configured including a piece of launcher software 141, a storage 142, browser software 143, an agent application 144, a display section 145 and an operation input section 146.

The launcher software 141 monitors a predetermined status within the information processing apparatus 11. When certain conditions are satisfied, the launcher software 141 activates a predetermined application program (software). The launcher software 141 itself is executed when the information processing apparatus 11 is activated.

The launcher software 141 detects that the IC card 13 is held over the reader/writer 12 by the user i.e., the proximity of the IC card 13 via the non-contact communication section 121. When the proximity of the IC card 13 is detected, the launcher software 141 obtains the application list stored in the IC card 13 via the reader/writer 12, and recognizes the OTP application held by the IC card 13.

Also, when the proximity of the IC card 13 is detected, the launcher software 141 activates the browser software 143. Then, the launcher software 141 causes the browser software 143, which is activated based on an OTP application link table stored in the storage 142, to access to the jump site corresponding to the OTP application owned by the IC card 13.

With respect to the OTP application stored in the IC card 13, the OTP application link table in the storage 142 stores the objective jump sites to be accessed. However, as for the IC card 13 which is held over the reader/writer 12 by a user for the first time, the OTP application link table does not store the jump site information corresponding to the OTP application stored in the IC card 13. In this case, the launcher software 141 displays an initial setting screen on a display section 145 to prompt the user to carry out the initial setting.

FIG. 7 illustrates an example of an initial setting screen displayed on the display section 145 by the launcher software 141.

An initial setting screen 161 shown in FIG. 7 is provided with an input column 171 for setting the OTP application stored in the IC card 13, which includes a connection flag, an internal site, a piece of jump site information, a user ID and a service necessary application name.

The first input columns of the input column 171 displays "OTP application 1" which is a application name of a service necessary application stored in the IC card 13; a jump site information "http://www.xxx.com" which represents a jump site (site A) which uses the execution result of the OTP application 1; and a user ID "user A1" which is used to login to the site A.

The second input columns of the input column 171 displays "OTP application 2" which is a application name of a service necessary application stored in the IC card 13; a jump site information "http://www.yyy.co.jp" which represents a jump site (site B) which uses the execution result of the OTP application 2; and a user ID "user B1" which is used to login to the site B.

In the input columns of "jump site information" and "service necessary application name" in the input column 171, the information which is read from the application list of the IC card 13 is displayed respectively as default, and the user is allowed to change the same, if necessary.

When the IC card 13, which stores a service necessary application registered in the input column, is held over the reader/writer 12, the connection flag represents whether the jump site should be connected (accessed), and whether the login processing should be performed by using the registered user ID and the service necessary application.

In the input column 171, the connection flag in the first input column is "ON" (checked status), and the connection flag in the second input column is "OFF" (not checked status). Under such setting conditions, when the IC card 13 is held over the reader/writer 12, the launcher software 141 causes the browser software 143 to connect to the site A (http://www.xxx.com), but not to connect to the site B (http://www.yyy.co.jp).

As for the flag of the internal site, since a description will be made referring to FIG. 13, the description thereof is omitted here.

Provided below the input column 171 of the initial setting screen 161 is a checkbox 172 indicated as "Not to display from 2nd or later". When the checkbox 172 is being checked, as for the IC card 13 which has been detected once and the jump site and the like have been set through the initial setting screen, the initial setting screen 161 is not displayed from the 2nd or later detection. However, the initial setting screen 161 can be displayed through the menu of the launcher software 141 or the like, if necessary.

Provided below the checkbox 172 of the initial setting screen 161 are a registration button 173 and a cancel button 174. When the cancel button 174 is pressed, the launcher software 141 discards the input information, and maintains the OTP application link table in the storage 142. On the other hand, when the registration button 173 is pressed, the launcher software 141 stores the input information in the storage 142 as the OTP application link table. In the OTP application link table, in addition to the information displayed on the initial setting screen 161, an application identifier of the OTP application obtained from the IC card 13 is also stored being associated thereto.

Based on the OTP link table which is set through the initial setting screen 161, the launcher software 141 causes the activated browser software 143 to access to the jump site corresponding to the OTP application owned by the IC card 13 (connection flag is ON).

Returning to FIG. 5, when proximity of the IC card 13 is detected, the launcher software 141 activates the agent application 144.

The agent application 144 monitors the browser software 143 and determines whether the browser software 143 is connected to the jump site specified by the launcher software 141 and the login window is displayed. When the login window of the predetermined jump site is displayed on the browser software 143, the agent application 144 inputs the login information corresponding to the jump site; i.e., user ID and one time password on the login window.

At this time, the agent application 144 obtains the login information to be input into the login window as described below. That is, the agent application 144 refers to the OTP application link table which is stored in the storage 142 and causes the IC card 13 to activate and execute the OTP application corresponding to the jump site. The agent application 144 obtains the one time password as the execution result of the activated and executed OTP application from the IC card 13 via the reader/writer 12. Also, the agent application 144 reads and obtains the user ID corresponding to the jump site from the OTP application link table of the storage 142.

The display section 145 displays the browser software 143 and the initial setting screen shown in FIG. 7, which is generated by the launcher software 141.

The operation input section 146 receives input of characters and click operations made by the user on the initial setting screen and/or the browser software 143.

[Entire Processing Flow of Automatic Login System]

Figure 8:
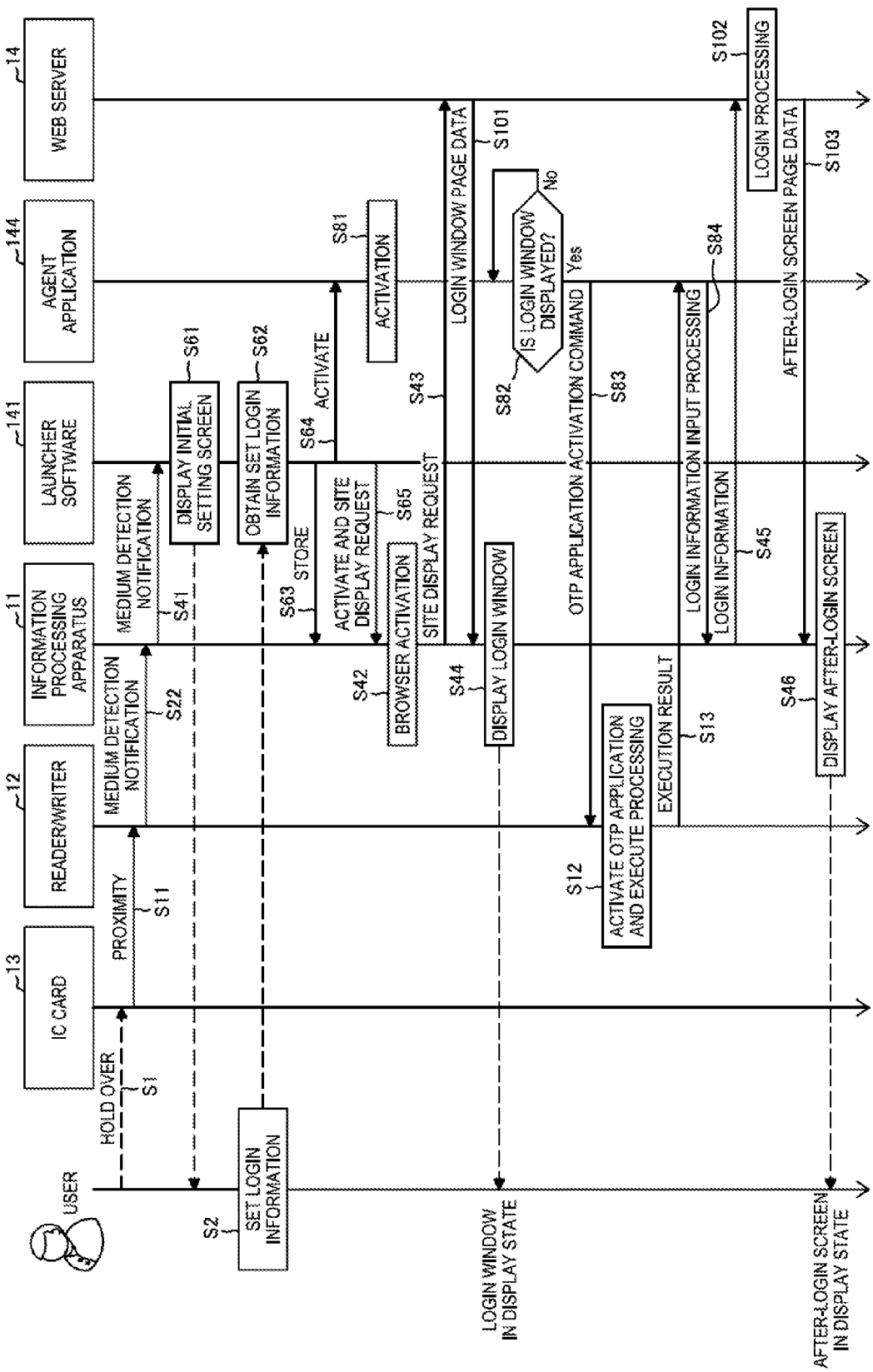
FIG. 8 is a flowchart illustrating a series of the processing of the automatic login system.

Subsequently, referring to a flowchart (sequence diagram) in FIG. 8, a description will be made on a series of the processing in the automatic login system 1. In FIG. 8, the information processing apparatus 11 means the browser software 143 and the display section 145 and the like other than the launcher software 141 and the agent application 144.

When the user holds the IC card 13 over the reader/writer 12 in step S1, the IC card 13 and the reader/writer 12 get closer to each other within a communication range of a predetermined distance in step S11. Then, the reader/writer 12 detects the IC card 13 positioned closer thereto in step S22 and transmits a predetermined medium detection notification which represents the detection of the IC card 13 to the information processing apparatus 11.

The device driver that controls the reader/writer of the information processing apparatus 11 obtains the medium detection notification from the reader/writer 12 in step S41 and notifies the same to the launcher software 141.

The launcher software 141 displays the initial setting screen 161 shown in FIG. 7 on the display section 145 in step S61.

The user sets a set of login information of the service necessary application (OTP application), which is necessary for login at the jump site including an application name, the jump site information, and user ID which are stored in the IC card 13 as described referring to FIG. 7 in step S2.

The launcher software 141 obtains the login information which is set through the initial setting screen 161 in step S62 and stores the same in the OTP application link table in the storage 142 of the information processing apparatus 11 in step S63.

Note that, in the description of FIG. 8, in the OTP application 1 and the OTP application 2 held by the IC card 13, only the connection flag of the OTP application 1 is ON as shown in FIG. 7.

When the checkbox 172 "Not to display from 2nd or later" is ON of the initial setting screen 161, from 2nd or later operation, the above-described medium detection notification of the IC card 13 for storing the OTP application from step S61 to S63 is omitted. For identifying the IC card 13, the identification information which is uniquely allotted for each of the IC card 13 or the identification information which is uniquely allotted for each communication device performing non-contact communication may be used.

Subsequently, the launcher software 141 activates the agent application 144 in step S64, and activates the agent application 144 in step S81.

Also, the launcher software 141 activates the browser software 143 in step S65, and to the browser software 143, transmits a display request of the site A which is the jump site of the OTP application 1 based on the OTP application link table in the storage 142.

The processing in step S64 and step S65 may be executed simultaneously, or the processing in step S65 may be executed first.

The browser software 143 in the information processing apparatus 11 is activated by the activation command from the launcher software 141 in step S42, and transmits a site display request to the site A (http://www.xxx.com) which is specified by the launcher software 141 in step S43.

The Web server 14, which has the address of site A, receives the site display request from the browser software 143 in step S101, and transmits a piece of page data of the login window responding to the received site display request.

Receiving a piece of page data of the login window from the Web server 14 in step S44, the browser software 143 displays the login window.

On the other hand, after activation in step S81, the agent application 144 determines whether the login window is displayed by the browser software 143 in step S82, and stays in standby (monitoring) until it is determined the login window is displayed.

When it is determined that the login window is displayed in step S82, the processing proceeds to step S83. Based on the OTP application link table, the agent application 144 identifies the OTP application 1 corresponding to the site A to which the browser software 143 is connected. The agent application 144 transmits the OTP application activation command, which specifies the OTP application 1 with the application identifier, to the IC card 13 via the reader/writer 12.

The IC card 13 activates the OTP application 1 based on the OTP application activation command from the agent application 144 in step S12 and executes the one time password generation processing.

The IC card 13 transmits the one time password as the execution result to the agent application 144 via the reader/writer 12 in step S13.

The agent application 144 performs the login information input processing on the login window of the site A of the browser software 143 in step S84. That is, the agent application 144 obtains the user ID corresponding to the site A from the OTP application link table. The agent application 144 inputs the obtained user ID and the one time password transmitted from the IC card 13 into a predetermined column of the login window of the site A in the browser software 143, and causes the browser software 143 to access to the Web server 14.

The browser software 143 transmits the input login information to the Web server 14 in step S45. The Web server 14 executes the login processing (authentication processing) based on the received login information in step S102. When the login processing succeeds, the Web server 14 transmits the page data of a screen to be displayed after login (hereinafter, referred to as after-login screen) to the browser software 143 in step S103.

The browser software 143 receives the page data of the after-login screen and display the same in step S46.

The processing of login in the automatic login system 1 is executed as described above.

[Entire Flow of Information Processing Apparatus 11]

Subsequently, referring to FIG. 8, a detailed description will be made on the processing of the information processing apparatus 11 in the above-described entire processing.

Figure 9:
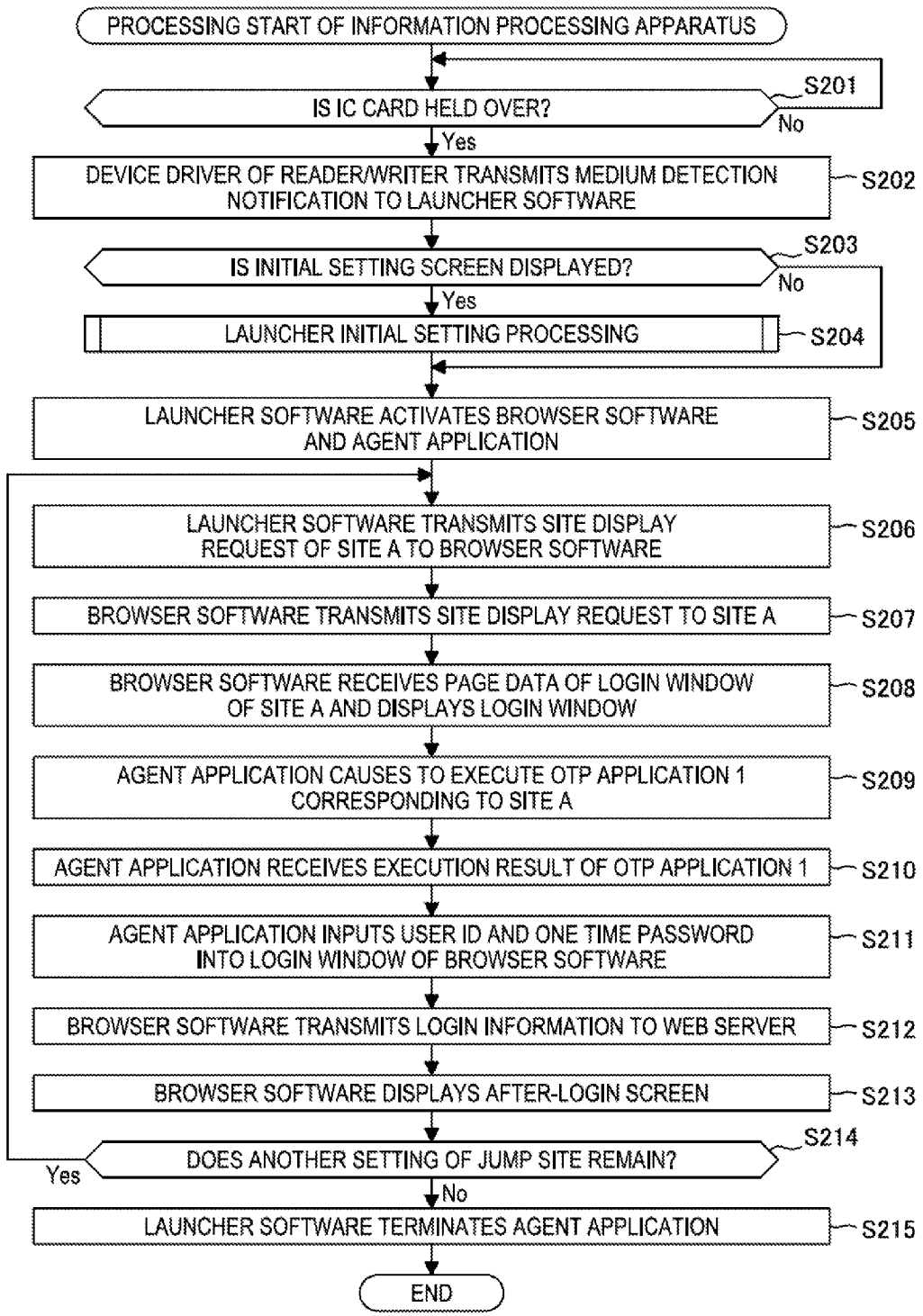
FIG. 9 is a flowchart illustrating a processing by an information processing apparatus.

FIG. 9 is a flowchart illustrating the processing of the information processing apparatus 11 in the automatic login system 1.

The device driver controlling the reader/writer 12 of the information processing apparatus 11 determines whether the IC card 13 is held over the reader/writer 12 in step S201, and stay in standby until it is determined the IC card 13 is held over the reader/writer 12.

When it is determined the IC card 13 is held over in step S201, the processing proceeds to step S202. The device driver of the reader/writer 12 transmits a predetermined medium detection notification representing the fact that the IC card 13 is detected to the launcher software 141. Since the medium detection notification includes a piece of information for identifying the IC card 13, it is possible to identify the detected IC card 13.

The launcher software 141 determines whether the initial setting screen should be displayed in step S203. In step S203, when the detected IC card 13 has been detected previously, and when the checkbox 172 "Not to display from 2nd or later" is ON in the initial setting screen 161 shown in FIG. 7, it is determined not display the initial setting screen 161.

When it is determined that the initial setting screen 161 is displayed in step S203, the processing proceeds to step S204. The launcher software 141 executes the launcher initial setting processing to perform the initial setting through the initial setting screen 161. As for the launcher initial setting processing, a description will be made later referring to FIG. 11.

Contrarily, when it is determined the initial setting screen 161 is not displayed in step S203, step S204 is skipped.

The launcher software 141 activates the browser software 143 and the agent application 144 in step S205.

The launcher software 141 transmits a site display request of the site A as the jump site of the OTP application 1 to the browser software 143 based on the OTP application link table in the storage 142 in step S206.

The browser software 143 connects to the site A specified by the launcher software 141 and transmits the site display request in step S207.

Responding to the site display request, the browser software 143 receives a piece of page data of the login window of the site A which is transmitted from the Web server 14 of the site A and displays the login window in step S208.

After the activation in step S205, the agent application 144 monitors the browser software 143. The agent application 144 detects that the browser software 143 displays the login window, and causes the IC card 13 to start and execute the OTP application 1 corresponding to the site A in step S209. In particular, the OTP application activation command which specifies the OTP application 1 corresponding to the site A is transmitted from the agent application 144 to the IC card 13 via the reader/writer 12.

The agent application 144 receives the one time password as the execution result by the OTP application 1 via the reader/writer 12 in step S210.

The agent application 144 inputs the user ID which is obtained from the OTP application link table and the one time password which is received from the IC card 13 into the login window of the browser software 143, and the agent application 144 causes the browser software 143 to access to the Web server 14 in step S211.

The browser software 143 transmits the input login information (user ID and one time password) to the Web server 14 in step S212.

After performing login processing (authentication processing) with the transmitted login information, the browser software 143 receives a piece of the page data of the after-login screen, which is transmitted from the Web server 14 and displays the same in step S213.

The launcher software 141 refers to the OTP application link table and determines whether any other setting of jump site to be connected exist using the OTP application stored in the IC card 13 in step S214. That is, the launcher software 141 determines whether any jump site, which is another OTP application stored in the IC card 13 and the connection flag of which is ON, remains in the OTP application link table.

When it is determined another setting of jump site remains in step S214, the processing returns to step S206, and the above-described processing from step S206 to S214 is repeated.

Figure 10:
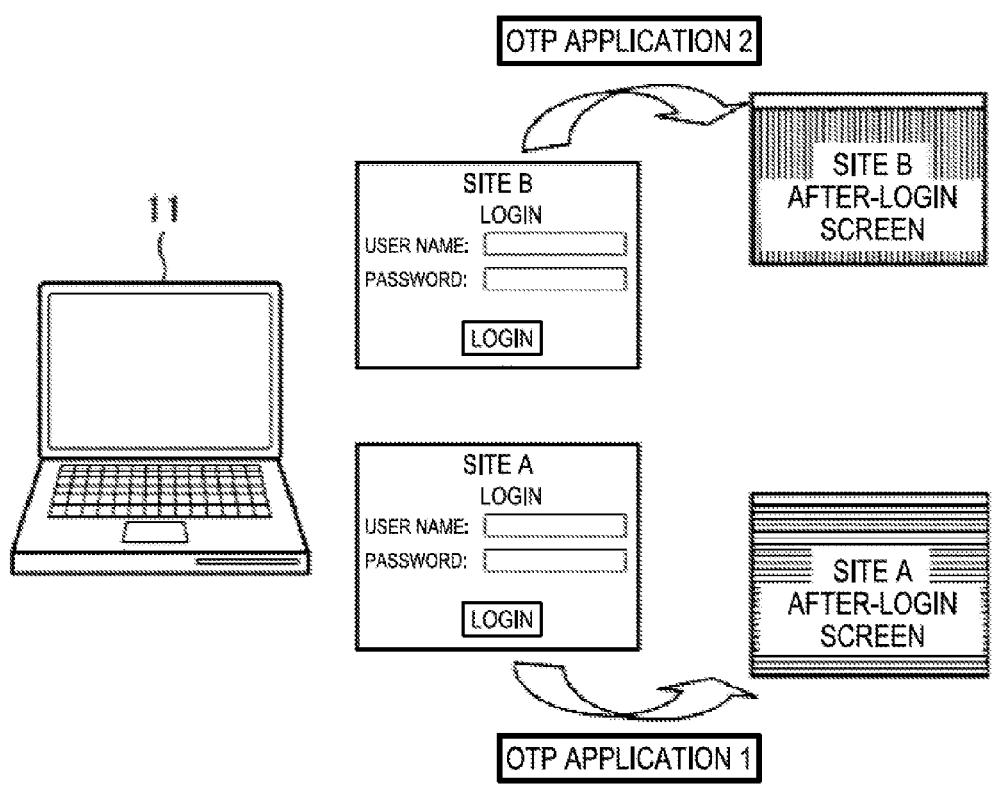
FIG. 10 illustrates simultaneous login to plural sites.

Accordingly, for example, when both of the connection flags of the site A and the site B are ON in the initial setting screen 161 shown in FIG. 7, the user can automatically login to both of the site A and the site B (simultaneously) as shown in FIG. 10 just by holding the IC card 13 over the reader/writer 12.

On the other hand, when it is determined no other setting of jump site remains, the processing proceeds to step S215, and the launcher software 141 terminates the agent application 144.

Figure 11:
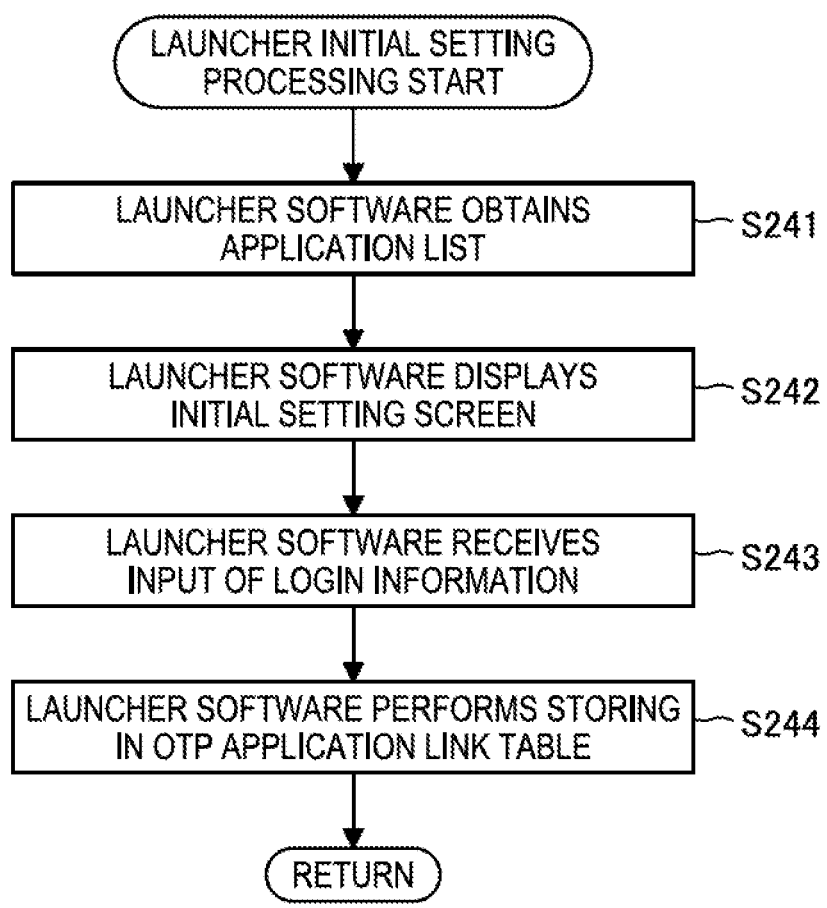
FIG. 11 is a flowchart showing a detailed processing of launcher initial setting processing.

FIG. 11 is a flowchart illustrating detailed processing of the launcher initial setting processing which is made in step S204 described above.

In this processing, the launcher software 141 obtains an application list from the IC card 13 via the reader/writer 12 in step S241.

In step S242, the launcher software 141 displays the initial setting screen 161 on the display section 145 shown in FIG. 7.

In step S243, the launcher software 141 receives an input of the information (login information) including the jump site information, the user ID and the application name of the service necessary application (OTP application), which are input by the user through the initial setting screen 161.

When the registration button 173 of the initial setting screen 161 is pressed by the user, the information input through the initial setting screen 161 is stored in the OTP application link table in the storage 142 and the launcher initial setting processing is terminated in step S244. After terminating the launcher initial setting processing, the processing returns to the processing shown in FIG. 9.

According to the above-describe processing of the automatic login system 1, by just holding the IC card 13 over the reader/writer 12, the user can automatically login to one or more sites. That is, the login to plural service sites is easily carried out.

Figure 12:
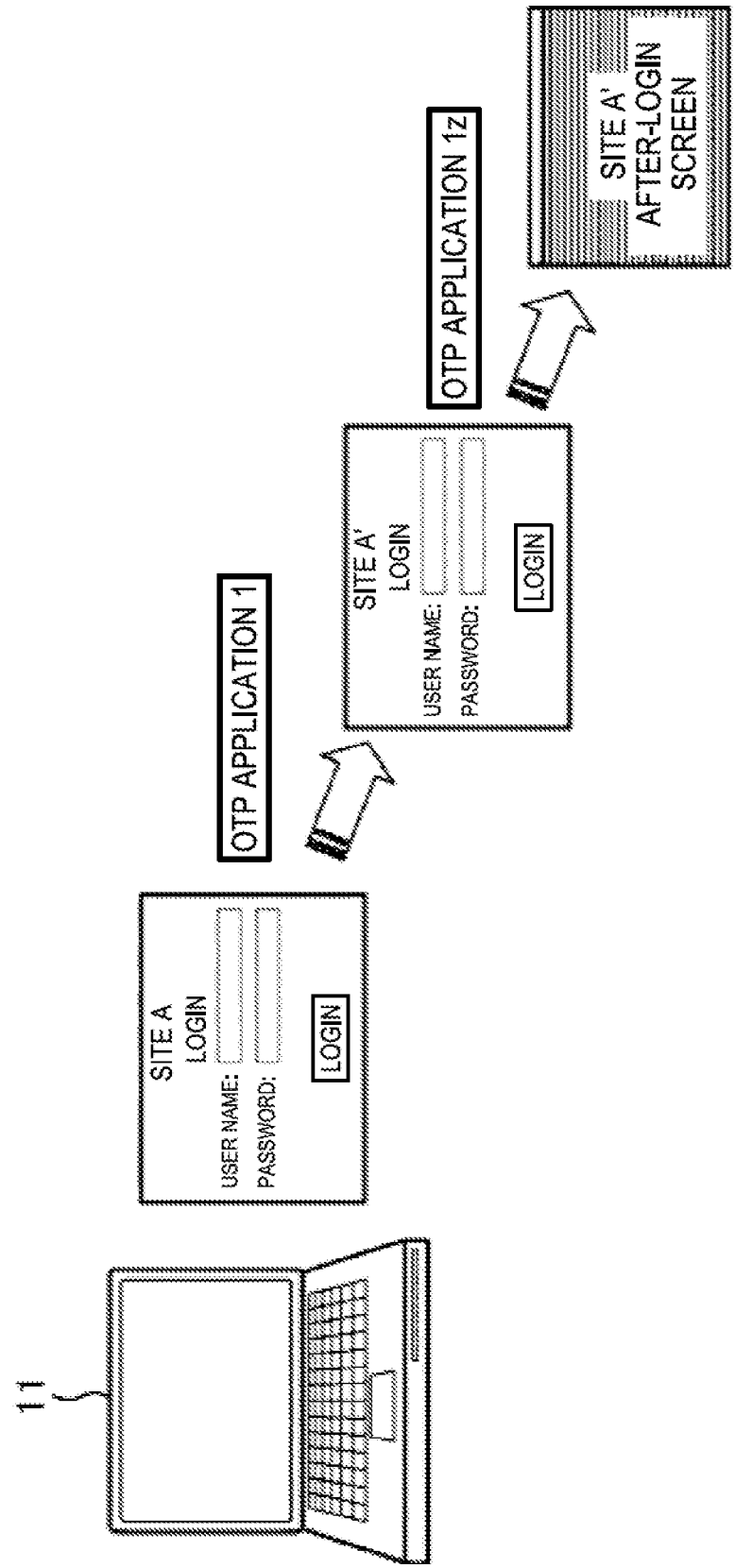
FIG. 12 illustrates a login to plural sites in a master-servant relationship.

Depending on the service site, for example, there may be a site which has a structure that, after login authentication is made on the site A as a first jump site, further another login authentication is necessary on a predetermined site A' within the site A as shown in FIG. 12.

Referring to FIG. 12, the address of the site A is "http://www.xxx.com", and necessary OTP application is "OTP application 1"; the address of the internal site A' is "http://zzz.com", and necessary OTP application is "OTP application 1z". On the launcher software 141, the initial setting allows automatic login on a site which has a structure in a master-servant relationship.

FIG. 13 illustrates a setting example of the initial setting screen 161 which allows automatic login to the site A and internal site A' in a master-servant relationship as shown in FIG. 12.

When the checkbox of an internal site of the input column 171, the description of which was omitted in FIG. 7 described above, is ON (checked) as shown in FIG. 13, setting of the jump site information, the user ID, and the service necessary application name can be made on plural sites in a master-servant relationship.

When checkbox of the internal site is ON, a number which is necessary login authentication is specified by the user, input columns corresponding to the specified number are displayed for inputting the jump site information, the user ID and the service necessary application name. FIG. 13 shows an example in which "2" is specified as the number as the times of required login authentication; and the number in columns of the internal site indicates login order (priority). When the setting is made as shown in FIG. 13, it is possible to login to plural sites in a master-servant relationship as described with reference to FIG. 12.

[Modification]

Embodiments of the present technology are not limited to the above-described embodiments, but various modifications are possible within a range of the spirit of the present technology.

For example, in the above embodiment, the functions of the agent application 144 may be executed by the launcher software 141. That is, the launcher software 141 and the agent application 144 may be integrated into one software (application program). The functions of either or both of the launcher software 141 and the agent application 144 may be achieved in a form of plug-in software of the browser software 143.

In the above-described embodiment, the OTP application link table is configured to be stored in the storage 142 within the information processing apparatus 11. However, the OTP application link table may be configured to be stored in a secure memory area of the IC card 13 or a predetermined cloud server (including Web server 14 or 15) on the network other than the information processing apparatus 11. In this case, the information on the storage for the OTP application link table is stored in the storage 142 of the information processing apparatus 11.

In the above-described embodiment, the information processing apparatus 11 is constituted of, for example, a personal computer. However, the information processing apparatus 11 may be constituted of a TV receiver or a KIOSK terminal provided with a display and a network connection function.

The other side device which performs a non-contact communication with the information processing apparatus 11 may not be the IC card 13, but may be a portable terminal (mobile phone) or a tablet terminal such as smart phone which is provided with a non-contact communication function.

In the above embodiment, as an example of the service necessary application, the OTP application which outputs the one time password necessary for login processing at the jump site has been described.

However, the service necessary application may output a piece of information other than the one time password as the information necessary at the jump site. In other word, the service necessary application is not limited to the OTP application.

For example, the service necessary application may obtain a piece of terminal identification information such as MAC address which identifies the information processing apparatus 11 or a piece of R/W identification information which identifies the reader/writer 12 as the information necessary at the jump site and output the same from the information processing apparatus 11 (via the reader/writer 12). In this case, the jump site may be a service site which identifies the maker of the information processing apparatus based on, for example, the terminal identification information; thereby services each different depend on the maker may be provided to the user. Or, the jump site may be a service site which identifies a dealer group employing the same from the R/W identification information; thereby services corresponding to the dealer group may be provided.

Also, for example, when the other side apparatus which performs a non-contact communication with the information processing apparatus 11 is a portable terminal provided with the GPS function, the service necessary application may be configured to obtain a piece of GPS information representing the present location of the user as the information necessary at the jump site and output the same. In this case, the jump site may be, for example, a service site which provides different services in accordance with the present location of the user.

Even when the IC card 13 is not provided with GPS function, for example, the IC card 13 stores a database of the location where the reader/writers 12 are provided (address), and when the service necessary application obtains a piece of R/W identification information from the information processing apparatus 11, and recognizes the location of the reader/writer 12 based on the database; thereby the information representing the present location of the user can be output.

In this specification, needless to say that when the steps illustrated in the flowcharts may be executed along the described order in time series. However, even when the steps may not necessary to execute in time series, but may be executed at a desired timing; in parallel or upon a call is made.

Also, in this specification, the system means entire device configured including plural apparatus.

Additionally, the present technology may also be configured as below.

(1) An information processing apparatus, including:

a non-contact communication section that is configured to perform non-contact communication with a communication device which stores at least two pieces of software outputting information necessary for enjoying a predetermined service provided by a server;

an obtaining section that is configured to obtain connection target information for connecting to the server and identification information indicating the software corresponding to the connection target information; and a control section that is configured to perform control of, via the non-contact communication section, issuing an instruction to the communication device to execute the software indicated by the identification information, obtaining an execution result of the software executed in accordance with the instruction, and transmitting the execution result to the server.

(2) The information processing apparatus according to (1), further including a storage that is configured to store, in association with the connection target information, either one of at least two pieces of the identification information indicating at least two pieces of the software, respectively, which are read via the non-contact communication section and stored by the communication device.

(3) The information processing apparatus according to (2), wherein the obtaining section is configured to obtain the connection target information and the identification information corresponding thereto from the storage.

(4) The information processing apparatus according to (2) or (3), wherein the storage is configured to store a user ID in association with the connection target information.

(5) The information processing apparatus according to any one of (2) to (4), wherein the storage is configured to store at least two pairs of the connection target information and the identification information corresponding thereto, and the control section is configured to perform control of issuing an instruction to the communication device to execute at least two pieces of the software, obtaining the execution result, and transmitting the execution result to at least the two servers indicated by at least two pieces of the connection target information.

(6) The information processing apparatus according to any one of (2) to (5), wherein the storage is configured to store the identification information corresponding to each of first connection target information which is the primary piece of connection target information and second connection target information which is the connection target information of the server that is in a master-servant relationship with the server indicated by the first connection target information, and the control section is configured to perform control of issuing an instruction to the communication device to execute the two pieces of software corresponding to the first connection target information and second connection target information, obtaining the execution result, and sequentially transmitting the execution result to the server indicated by the first connection target information and the server indicated by the second connection target information.

(7) The information processing apparatus according to any one of (2) to (6), wherein the software is software that outputs authentication information necessary for logging into the server.

(8) An information processing method, including:

obtaining connection target information for connecting to a server which provides a predetermined service and identification information indicating the software corresponding to the connection target information; and performing control of, through non-contact communication with a communication device which stores at least two pieces of the software, issuing an instruction to the communication device to execute the software indicated by the identification information, obtaining an execution result of the software executed in accordance with the instruction from the communication device, and transmitting the execution result to the server.

(9) A storage medium storing a program causing a computer to function as:

a non-contact communication control section that performs control of non-contact communication with a communication device which stores at least two pieces of software outputting information necessary for enjoying a predetermined service provided by a server;

an obtaining section that obtains connection target information for connecting to the server and identification information indicating the software corresponding to the connection target information; and a transmission control section that performs control of issuing an instruction to the communication device to execute the software indicated by the identification information via the non-contact communication, obtaining an execution result of the software executed in accordance with the instruction via the non-contact communication, and transmitting the execution result to the server.

(10) An information processing apparatus, including:

a non-contact communication section that is configured to perform non-contact communication with an information processing terminal that performs processing to access to a server which provides a predetermined service;

a storage that is configured to store at least two pieces of software for outputting information necessary for the information processing terminal to enjoy the service from the server; and an execution section that is configured to execute predetermined software out of the at least two pieces of software stored in the storage in accordance with an instruction from the information processing terminal, wherein the non-contact communication section is configured to transmit an execution result obtained by the execution section to the information processing terminal in a manner of non-contact communication.

What is claimed is:
1. An information processing apparatus, comprising:
a central processing unit (CPU) operable to:
perform non-contact communication with a communication device, wherein the communication device stores a plurality of software applications and wherein each of the plurality of software applications outputs information for a predetermined service provided by each of a plurality of servers;
obtain connection target information from the communication device, for connecting to one server from the plurality of servers, and identification information indicating one of the plurality of software applications corresponding to the connection target information, wherein the connection target information and the identification information of a software application corresponding to the connection target information are obtained based on a setting entered by a user on the information processing apparatus, wherein the setting includes information on the connection target information, the identification information of the software application corresponding to the connection target information and a user ID; and
perform control of issuing an instruction to the communication device to execute the one of the plurality of software applications, indicated by the identification information, obtaining an execution result of execution of the one of the plurality of software applications from the communication device, and transmitting the obtained execution result to the one server to allow an automatic login to the one server, wherein the obtained connection target information is used for selecting the one server from the plurality of servers.

2. The information processing apparatus according to claim 1, further comprising
a storage operable to store, in association with the connection target information, the identification information which is read from the communication device.

3. The information processing apparatus according to claim 2, wherein
the CPU is operable to obtain the identification information corresponding to the connection target information from the storage.

4. The information processing apparatus according to claim 2, wherein
the storage is operable to store a user identity (ID) in association with the connection target information.

5. The information processing apparatus according to claim 2, wherein
the storage is operable to store the connection target information and the identification information, and
the CPU is operable to perform control of issuing the instruction to the communication device to execute the one of the plurality of software applications, obtaining the execution result, and transmitting the obtained execution result to the one server.

6. The information processing apparatus according to claim 2, wherein
the storage is operable to store the identification information corresponding to first connection target information of a first server and second connection target information of a second server, and
the CPU is operable to perform control of issuing the instruction to the communication device to execute a first software application and a second software application corresponding to the first connection target information and the second connection target information, obtaining the execution result, and transmitting the execution result to the first server indicated by the first connection target information and the second server indicated by the second connection target information.

7. The information processing apparatus according to claim 1, wherein
each of the plurality of software applications outputs authentication information for logging into one server from the plurality of servers.

8. An information processing method, comprising:
in a central processing unit (CPU) of an information processing apparatus:
obtaining connection target information from a communication device, for connecting to a plurality of servers, each of which provides a predetermined service, and identification information indicating one of a plurality of software applications corresponding to the connection target information, wherein the connection target information and the identification information of a software application corresponding to the connection target information are obtained based on a setting entered by a user on the information processing apparatus, wherein the setting includes information on the connection target information, the identification information of the software application corresponding to the connection target information and a user ID;
performing control of issuing an instruction to the communication device to execute one of the plurality of software applications, indicated by the identification information;
obtaining an execution result of execution of the one of the plurality of software applications from the communication device; and
transmitting the obtained execution result to one server from the plurality of servers to allow an automatic login to the one server, wherein the one server is selected from the plurality of servers based on the obtained connection target information.

9. A non-transitory computer readable medium having stored thereon a set of computer-executable instructions for causing a computer to perform steps comprising:
obtaining connection target information from a communication device, for connecting to a plurality of servers, each of which provides a predetermined service, and identification information indicating one of a plurality of software applications corresponding to the connection target information, wherein the connection target information and the identification information of a software application corresponding to the connection target information are obtained based on a setting entered by a user on an information processing apparatus, wherein the setting includes information on the connection target information, the identification information of the software application corresponding to the connection target information and a user ID;
performing control of issuing an instruction to the communication device to execute one of the plurality of software applications, indicated by the identification information;
obtaining an execution result of execution of the one of the plurality of software applications from the communication device; and
transmitting the obtained execution result to one server from the plurality of servers to allow an automatic login to the one server, wherein the one server is selected from the plurality of servers based on the obtained connection target information.

10. A communication device, comprising:
a central processing unit (CPU) operable to:
perform non-contact communication with an information processing apparatus that performs processing to access to a plurality of servers, each of which provides a predetermined service;
store connection target information and a plurality of software applications, wherein each of the plurality of software applications outputs information for the information processing apparatus to access the predetermined service from the plurality of servers;
receive a setting from a user on a user interface of the information processing apparatus, wherein the setting includes information on the connection target information, the identification information of the software application corresponding to the connection target information and a user ID;
transmit the connection target information and identification information of a software application corresponding to the connection target information obtained based on the received setting to the information processing apparatus;
execute one of the plurality of software applications in accordance with an instruction issued from the information processing apparatus; and
transmit an execution result of the execution of the one of the plurality of software applications to the one server among the plurality of servers via the information processing apparatus to allow an automatic login to the one server, wherein the connection target information received by the information processing apparatus is used for selecting the one server from the plurality of servers.

11. The information processing apparatus according to claim 1, wherein
the connection target information comprises website information, and wherein each of the plurality of servers, indicated by the website information, provides the predetermined service.

12. The information processing apparatus according to claim 1, wherein
each of the plurality of software applications generates one time password (OTP) as the execution result.

13. The information processing apparatus according to claim 1, wherein
the CPU is operable to obtain an application list from the communication device, wherein the application list comprises name of each of the plurality of software applications, the identification information and the connection target information corresponding to each of the plurality of software applications.

14. The information processing apparatus according to claim 1, wherein
the CPU is operable to display a login window associated with the predetermined service provided by the one server.

15. The information processing apparatus according to claim 14, wherein
the CPU is operable to:
obtain a user identity (ID) associated with the connection target information, and
input the obtained user ID and the obtained execution result in the displayed login window, wherein the input user ID and the input execution result are used for the one server to execute login process.

16. The communication device according to claim 10, wherein
the CPU is operable to execute the one of the plurality of software applications, based on an application identifier, to output the information for the predetermined service, wherein the application identifier is identification information for identifying the one of the plurality of software applications.

* * * * *